United States Patent [19]

Siegenthaler

[11] Patent Number: 5,462,104

[45] Date of Patent: Oct. 31, 1995

[54] TOROIDAL CARCASS FOR ROAD VEHICLE TIRES

[75] Inventor: Karl J. Siegenthaler, Rome, Italy

[73] Assignee: Bridgestone Corporation, Tokyo, Japan

[21] Appl. No.: 323,212

[22] Filed: Oct. 14, 1994

[30] Foreign Application Priority Data

Dec. 14, 1993 [IT] Italy .................................. TO93A0945

[51] Int. Cl.⁶ ............................... B60C 9/02; B60C 9/10
[52] U.S. Cl. ......................... 152/563; 152/548; 156/117
[58] Field of Search .................................... 152/548, 563; 156/117

[56] References Cited

U.S. PATENT DOCUMENTS

| | | | |
|---|---|---|---|
| 1,328,006 | 1/1920 | McLeod . | |
| 1,366,220 | 1/1921 | Swinehart | 156/117 |
| 1,420,611 | 6/1922 | Dickinson | 156/117 |
| 5,344,514 | 9/1994 | Siegenthaler | 152/563 X |
| 5,383,992 | 1/1995 | Siegenthaler | 152/563 X |
| 5,394,920 | 3/1995 | Siegenthaler | 152/563 |

FOREIGN PATENT DOCUMENTS

| | | |
|---|---|---|
| 0009018 | 3/1980 | European Pat. Off. . |
| 0549869 | 7/1993 | European Pat. Off. . |
| 0583615 | 2/1994 | European Pat. Off. . |
| 3303595 | 8/1983 | Germany . |

*Primary Examiner*—Adrienne C. Johnstone
*Attorney, Agent, or Firm*—Carmen Santa Maria

[57] ABSTRACT

A toroidal carcass (1) for road vehicle tires, of the type presenting two annular beads (2, 3) connected by a toroidal reticulated structure (5) defined by tow numbers of loops (6, 7) extending in offset radial planes of the carcass (1) and from the respective beads (2, 3) to the center line of the reticulated structure (5); the loops (6, 7) being formed by winding respective continuous cords (8, 9) about the beads (2, 3) and being connected by a further continuous cord (13) extending along the center line of the reticulated structure (5).

4 Claims, 1 Drawing Sheet

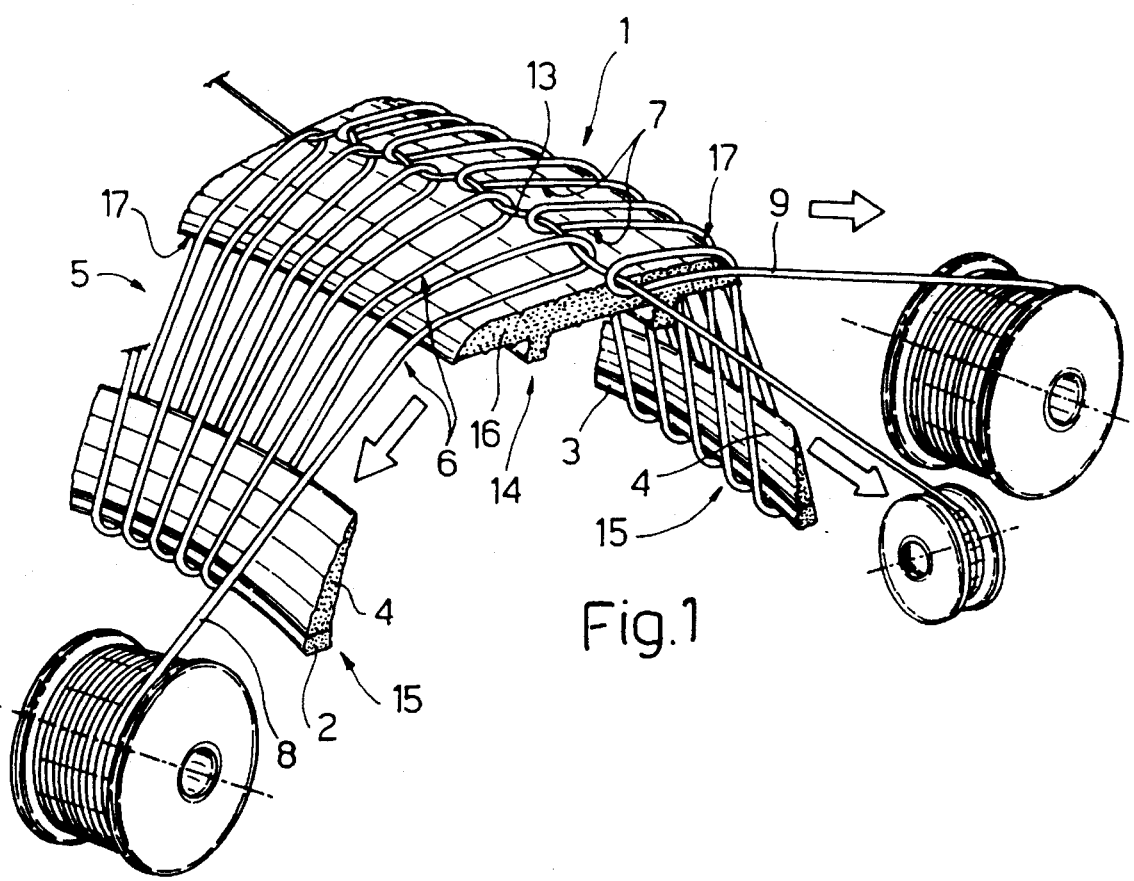
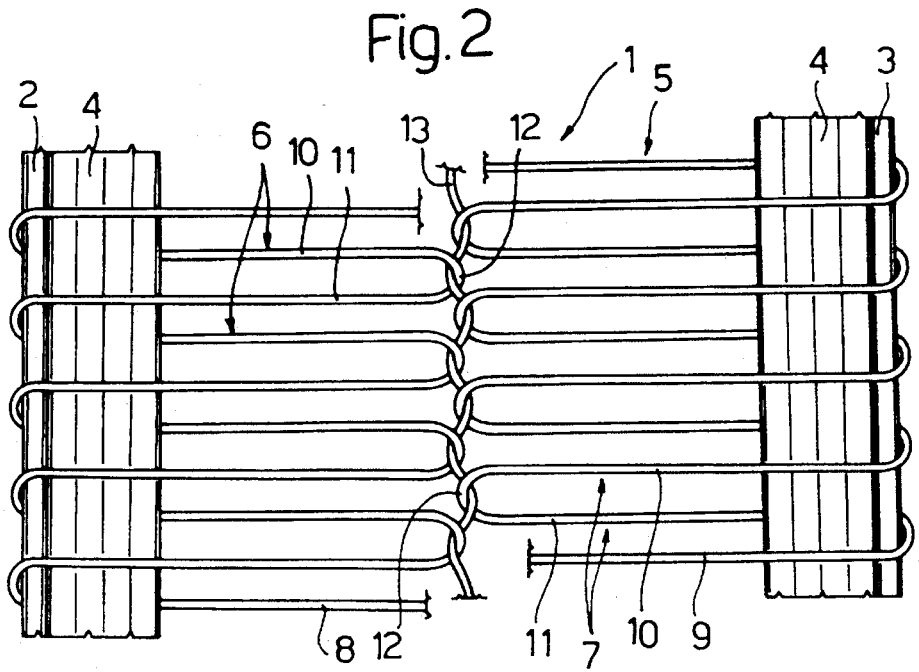

TOROIDAL CARCASS FOR ROAD VEHICLE TIRES

BACKGROUND OF THE INVENTION

1. Field of the Invention

The present invention relates to a toroidal carcass for road vehicle tires.

In particular, the present invention relates to a toroidal carcass of the type comprising two annular beads; and a toroidal reticulated structure connecting the beads which in turn is comprised of a number of elongated reinforcing elements extending in substantially radial planes in relation to the beads.

It is an object of the present invention to provide a carcass of the aforementioned type, wherein the reticulated structure may be formed cheaply and easily using continuous cords, i.e., cords which need not be precut for forming the reticulated structure.

SUMMARY OF THE INVENTION

According to the present invention, there is provided a carcass of the aforementioned type, characterized by the fact that said elongated elements are defined by a pair of loops, each loop in a pair, extending in respective radial planes in relation to and from the respective beads, and forming part of respective turns of respective continuous cords wound about the beads; a third continuous cord connecting the loops in said pair of loops.

BRIEF DESCRIPTION OF THE DRAWINGS

A non-limiting embodiment of the present invention will be described by way of example with reference to the accompanying drawings, in which:

FIG. 1 shows a schematic partial view in perspective of a preferred embodiment of the carcass according to the present invention;

FIG. 2 shows a partial plan view of the FIG. 1 carcass.

DESCRIPTION OF THE PREFERRED EMBODIMENTS

Numeral 1 in FIG. 1 indicates a toroidal carcass for a road vehicle tire.

Carcass 1 comprising tow annular beads 2 and 3 with respective fillers 4; and a toroidal reticulated structure 5 connecting beads 2 and 3, which in turn is comprised of a number of elongated reinforcing elements defined by a pair of substantially U-shaped, substantially identical loops 6 and 7 extending from respective beads 2 and 3 to the center line of structure 5, offset in relation to one another and in substantially radial planes in relation to beads 2 and 3.

Each loop of the pair of loops 6, 7 is formed from a respective continuous cord 8, 9 wound about respective bead 2, 3 to form a number of turns, each of which is drawn towards said center line of structure 5 to define a respective loop 6, 7 having two substantially parallel arms 10 and 11 connected by a curved portion 12.

Structure 5 is completed by a third continuous cord 13 extending along said center line and alternately engaging curved portions 12 of loops 6 and 7, to connect and maintain loops 6 and 7 in the position described above.

As regards to cords 8 and 9 and loops 6 and 7, the turns formed by cords 8 and 9 are wound inversely to each other about respective beads 2 and 3; and curved portions 12 of loops 6 and 7 are oppositely twisted 180° about cord 13, so as to substantially lock curved portions 12 in relation to cord 13. Also, loops 6 and 7 are so sized that cord 13 extends substantially along said center line.

Structure 5, enclosing beads 2 and 3, is preferably formed on a supporting frame 14 comprising an inner portion 15 defined by beads 2 and 3, forming the skeleton of carcass 1, and a removable auxiliary annular outer portion 16 defined by a number of releasably connected curved segments (not shown). Portion 16 is located between and radially outwards in relation to beads 2 and 3, so as to define, with beads 2 and 3, two annular openings 17.

When forming structure 5, frame 14 is preferably rotated about its axis, and structure 5 is formed about beads 2 and 3 and outwards of portion 16. In this connection, it should be emphasized that cords 8, 9 and 13 are continuous cord which, as opposed to being wound off a spool as shown schematically in FIG. 1, may be produced continuously and on the spot by respective dies (not shown).

I claim:

1. A toroidal carcass (1) for road vehicle tires, comprising:

the carcass, having two annular beads;

a toroidal reticulated structure connecting the beads which structure includes a number of elongated reinforcing elements extending in substantially radial planes in relation to the beads; said elongated elements defined by a pair of loops, each loop extending in respective radial planes in relation to and from the beads, and forming part of respective turns of respective first and second continuous cords wound about the beads; and a third continuous cord connecting the loops in said pair of loops.

2. A carcass as claimed in claim 1, wherein the radial planes of the loops are offset in relation to one another.

3. A carcass as claimed in claim 1 or 2, wherein said first and second cords are so wound that the respective loops have substantially the same length and wherein the third cord extends along the center line of the reticulated structure.

4. A carcass as claimed in claim 1, wherein each loop in said loop pair includes two substantially parallel arms connected by a curved portion engaged by said third cord, an end portion of each loop in said loop pair, adjacent to the respective curved portion, being twisted 180°.

* * * * *